Nov. 27, 1923.

T. RASMUSSEN 1,475,876

CRANKING MECHANISM

Filed Sept. 1, 1922

INVENTOR
Thorvald Rasmussen.
by Hazard and Miller
ATT'YS

Patented Nov. 27, 1923.

1,475,876

UNITED STATES PATENT OFFICE.

THORVALD RASMUSSEN, OF LOS ANGELES, CALIFORNIA, ASSIGNOR OF ONE-HALF TO SEVERIN TH. HANSEN, OF LONG BEACH, CALIFORNIA.

CRANKING MECHANISM.

Application filed September 1, 1922. Serial No. 585,642.

*To all whom it may concern:*

Be it known that I, THORVALD RASMUSSEN, a subject of the King of Great Britain, residing at Los Angeles, in the county of Los Angeles and State of California, have invented new and useful Improvements in Cranking Mechanism, of which the following is a specification.

My invention relates to cranking mechanism for automobile engines of the Ford type in which the starting crank is permanently associated with the crank case to prevent withdrawal thereof when not in use, wherefor the projecting portion of the crank is disposed in obscuring relation to the numbers on the license plate generally arranged beneath the radiator, and the entire starting crank is free to vibrate and rattle within its support.

It is a purpose of my invention to provide a cranking mechanism in which the crank handle is removably associated with the starting crank shaft so that when the cranking mechanism is not in use, the crank handle can be carried in the car. Furthermore, my invention includes a cup for housing the cranking shaft and associated parts to protect the latter from dust and to prevent rattling or vibration of the mechanism.

Although I have herein shown and described only one form of cranking mechanism embodying my invention, it is to be understood that various changes and modifications may be made herein without departing from the spirit of the invention and the spirit and scope of the appended claims.

In the accompanying drawings.

Figure 3:
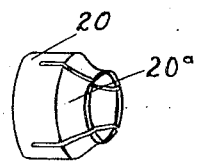
Fig. 3 is a detail perspective view of the locking collar comprised in the cranking mechanism shown in the preceding views.

Referring specifically to the drawings in which similar reference characters refer to similar parts, my invention in its present embodiment comprises a cranking shaft 15 which is rotatably mounted in the usual crank case bearing 16. The inner end of the shaft 15 is adapted to be extended into the collar 17 of the usual ratchet cup 18, and secured therein by means of a pin 19. The projecting end of the shaft 15 carries a locking collar 20 which, as clearly shown in Fig. 3, is provided with a plurality of spring fingers 20ª that gradually converge toward the free ends for a purpose which will be hereinafter described.

A ring washer 21 is slidably mounted upon the projecting end of the shaft 15 and is locked against outward movement by means of a cotter pin 22. A coil expansible spring 23 surrounds the shaft 15 between the collar 20 and the washer 21 so as to normally urge these elements in opposite directions, with the collar engaging the bearing 16 and the washer engaging the cotter pin 22. The extreme outer end of the shaft 15 is provided with a pin 24 which is received in slots 25 of a crank handle 26.

Figure 1:
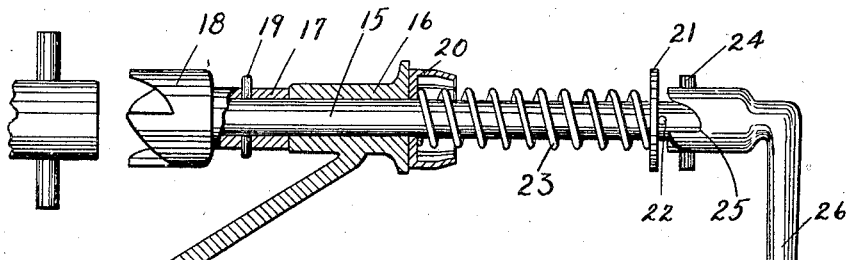
Figure 1 is a view showing the forward end of a crank case and associated parts having applied thereto one form of cranking mechanism embodying my invention, the latter being shown partly in section.
Figure 2:
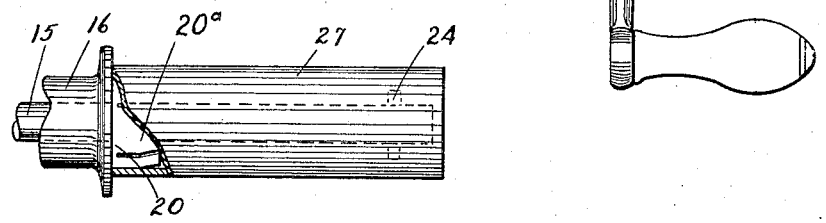
Fig. 2 is a view showing in side elevation, with a portion thereof broken away, the cranking mechanism shown in Fig. 1 and with the crank handle removed and the protecting cap in position.

As shown in Fig. 2, a protecting cap 27 is adapted to be used in conjunction with the cranking mechanism and particularly when the mechanism is not in use. This cap 27 is of tubular form with one end closed, and it is of such diameter as to be capable of being slid over the shaft 15 and washer 21 to engage the locking collar 20. The locking collar 20 serves to securely retain the protecting cap upon the shaft by virtue of the spring fingers 20ª, it being noted as shown in Fig. 2, that the fingers are extended into the open end of the cap and because of their tapered form it will be clear that the cap will be frictionally retained upon the collar.

In practice, the cap 27 is adapted to be removed from the shaft when using the crank 26, and by applying the crank so that the pin 24 engages within the slots, the shaft 15 can be forced rearwardly against the tension of the spring 23 to cause the ratchet cup to engage the crank shaft so that when the shaft 15 is rotated, the starting of the engine will be effected.

What is claimed is:

1. A cranking mechanism comprising a shaft adapted to be supported in the usual crank case bearing, a ratchet cup carried by one end of the shaft, a locking collar mounted on the shaft and adapted to abut said crank case bearing, a washer mounted on the shaft, a pin extending through the shaft for limiting the movement of the washer in one direction, a coiled expansible spring interposed between the locking collar and washer, a pin extending through the shaft adjacent the washer, and a crank handle adapted to engage the last mentioned pin.

2. A cranking mechanism comprising a shaft adapted to be supported in the usual crank case bearing, a ratchet cup carried by one end of the shaft, a locking collar mounted on the shaft and adapted to abut said crank case bearing, a washer mounted on the shaft, a pin extending through the shaft for limiting the movement of the washer in one direction, an expansible spring interposed between the locking collar and washer, a pin extending through the shaft adjacent the washer, and a protecting cap removably mounted on the shaft and engaged by said collar for frictionally retaining the same thereon.

3. A cranking mechanism comprising a shaft, a resilient locking member mounted on the shaft, and a protecting cap for covering a portion of said shaft, said cap frictionally engaging the member to be releasably retained on the shaft.

4. A cranking mechanism comprising a shaft, a locking collar mounted on the shaft and including spring fingers, and a protecting cap for covering a portion of said shaft, said cap engaging the fingers of said collar so as to be frictionally retained upon the shaft.

5. A cranking mechanism comprising a shaft, a ratchet element fixed on the shaft, a locking member mounted on the shaft, an element loosely mounted on the shaft, means for limiting the movement of the element in one direction on the shaft, a resilient member interposed between the locking member and the element, crank connecting means on the shaft, and a protecting cap removably mounted on the shaft and engaged by the locking member for retaining the same thereon.

In testimony whereof I have signed my name to this specification.

THORVALD RASMUSSEN.